(12) United States Patent
Schwartz et al.

(10) Patent No.: US 12,717,061 B2
(45) Date of Patent: Aug. 25, 2026

(54) METHOD AND APPARATUS FOR COCKROACH MONITORING

(71) Applicant: Ecolab USA Inc., Saint Paul, MN (US)

(72) Inventors: Daniel Ronald Schwartz, Cottage Grove, MN (US); Brandon Matthew Davis, Oswego, IL (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 18/824,338

(22) Filed: Sep. 4, 2024

(65) Prior Publication Data

US 2025/0085452 A1 Mar. 13, 2025

Related U.S. Application Data

(60) Provisional application No. 63/582,276, filed on Sep. 13, 2023.

(51) Int. Cl.

| | |
|---|---|
| ***G01V 8/12*** | (2006.01) |
| ***A01M 1/02*** | (2006.01) |
| ***A01M 1/10*** | (2006.01) |
| ***A01M 1/14*** | (2006.01) |

(52) U.S. Cl.

CPC ............... *G01V 8/12* (2013.01); *A01M 1/026* (2013.01); *A01M 1/103* (2013.01); *A01M 1/14* (2013.01)

(58) Field of Classification Search

CPC ...... A01M 1/026; A01M 1/103; A01M 1/106; A01M 1/14; G01V 8/12

See application file for complete search history.

(56) References Cited

U.S. PATENT DOCUMENTS

| | | | | |
|---|---|---|---|---|
| 8,635,806 | B2 * | 1/2014 | Gardner, Jr. | A01M 23/00 43/107 |
| 9,179,665 | B2 * | 11/2015 | Frojmovics | H04W 4/16 |
| 9,664,813 | B2 * | 5/2017 | Janét | G01N 35/00 |

(Continued)

FOREIGN PATENT DOCUMENTS

| | | |
|---|---|---|
| AU | 2021271102 | 12/2022 |
| EP | 3566575 | 11/2019 |

(Continued)

OTHER PUBLICATIONS

"International Application Serial No. PCT US2024 045139, International Search Report mailed Nov. 28, 2024", 6 pgs.

(Continued)

*Primary Examiner* — Michael H Wang
(74) *Attorney, Agent, or Firm* — Schwegman Lundberg & Woessner, P.A.

(57) ABSTRACT

A cockroach monitor includes a monitoring chamber with one or more openings to allow cockroaches to enter. A light is emitted from a light emitter into the monitoring chamber and received by a photoelectric transducer for detecting cockroaches by analyzing the received light for obstruction in the path of the light. In various embodiments, a board having a sticky surface can be attached to a ceiling of the monitoring chamber to capture cockroaches by their backs. In various embodiment, the light emitter and the photoelectric transducer are arranged in the cockroach monitor for the photoelectric transducer to receive the emitted light directly form the light emitter (without reflection) or to receive the emitted light as reflected from a surface.

22 Claims, 11 Drawing Sheets

(56) References Cited

U.S. PATENT DOCUMENTS

| | | | | |
|---|---|---|---|---|
| 10,375,947 | B2 * | 8/2019 | Liu | G06V 10/145 |
| 11,204,440 | B2 * | 12/2021 | Liu | G01V 8/20 |
| 11,533,897 | B2 * | 12/2022 | Bäckmark | A01M 1/02 |
| 2001/0000299 | A1 * | 4/2001 | Lake | A01M 1/026<br>340/384.2 |
| 2003/0218543 | A1 * | 11/2003 | Gardner, Jr. | A01M 31/002<br>43/132.1 |
| 2005/0025357 | A1 * | 2/2005 | Landwehr | A01M 3/005<br>382/224 |
| 2007/0169401 | A1 * | 7/2007 | Chyun | A01M 1/145<br>43/107 |
| 2009/0183419 | A1 * | 7/2009 | Harris | A01M 1/14<br>43/132.1 |
| 2013/0223677 | A1 * | 8/2013 | Ots | A01M 1/026<br>43/107 |
| 2016/0238737 | A1 * | 8/2016 | Janét | A01M 1/103 |
| 2017/0290321 | A1 * | 10/2017 | Choe | A01M 1/103 |
| 2019/0289840 | A1 * | 9/2019 | Kaye | G01D 5/2405 |
| 2021/0007340 | A1 * | 1/2021 | Frojmovics | A01M 1/023 |
| 2022/0142136 | A1 * | 5/2022 | Kubota | G01V 8/12 |
| 2022/0206180 | A1 * | 6/2022 | Buis | A01M 1/02 |

FOREIGN PATENT DOCUMENTS

| | | |
|---|---|---|
| KR | 100895505 | 4/2009 |
| WO | 2019138242 | 7/2019 |
| WO | 2025058900 | 3/2025 |

OTHER PUBLICATIONS

"International Application Serial No. PCT US2024 045139, Written Opinion mailed Nov. 28, 2024", 8 pgs.

* cited by examiner 530
512
510
511

| SAMPLE | SIGNAL |
| --- | --- |
| BACKGROUND | 5948 |
| #5 | 5920 |
| #5 + #4 | 5904 |
| #1 | 5914 |
| #1 + #2 | 5903 |
| #1 + #2 + #3 | 5895 |
| ALL | 5449 |

METHOD AND APPARATUS FOR COCKROACH MONITORING

CROSS-REFERENCE TO RELATED APPLICATION

This patent application claims the benefit of U.S. Provisional Patent Application No. 63/582,276, filed Sep. 13, 2023, which is incorporated by reference herein in its entirety.

TECHNICAL FIELD

The present disclosure relates generally to pest control and more particularly to a method and apparatus for detecting presence of pests such as cockroaches.

BACKGROUND

Pest control can include monitoring presence and activities of pests before, during, and/or after action is taken for their exclusion or elimination. For example, sticky boards are used for trapping pests such as cockroaches. They may also be used to monitor presence and infestation of pests, for example by tracking the number and frequency of pest captures. Once deployed, each sticky board may be monitored to determine whether it has been effective (e.g., as indicated by trapped cockroaches) and/or likely remains effective (e.g., as indicated by the remaining sticky surface not covered the trapped cockroaches). Results of the monitoring indicates need for repositioning and/or replacement of each sticky board as well as signs of pest infestation. Such monitoring when performed manually can be a labor-intensive and time-consuming task. For example, a pest control service provider may deploy many sticky-board cockroach traps in a customer site (e.g., a food service establishment) and then visit the customer site on a periodic basis to monitor the status of each sticky board including the number of cockroaches being captured. Frequent visits by a field technician from the pest control service provider may be desirable, if not necessary, for effective cockroach elimination by ensuring effectiveness of the deployed sticky boards and/or detection early signs of cockroach infestation.

SUMMARY

A cockroach monitor includes a monitoring chamber with one or more openings to allow cockroaches to enter. A light is emitted from a light emitter into the monitoring chamber and received by a photoelectric transducer for detecting cockroaches by analyzing the received light for obstruction in the path of the light. In various embodiments, a board having a sticky surface can be attached to a ceiling of the monitoring chamber to capture cockroaches by their backs. In various embodiment, the light emitter and the photoelectric transducer are arranged in the cockroach monitor for the photoelectric transducer to receive the emitted light directly form the light emitter (without reflection) or to receive the emitted light as reflected from a surface.

An example of a pest control system including a cockroach monitor is provided. The cockroach monitor may include a housing and a cockroach detector. The housing may form a monitoring chamber having one or more openings to allow cockroaches to enter the monitoring chamber and a ceiling to face backs of the cockroaches entering the monitoring chamber. The cockroach detector may include a light emitter, a photoelectric transducer, and a detection circuit. The light emitter is configured to emit a light. The photoelectric transducer is configured to receive the light and to produce an electrical signal indicative of an intensity of the received light. The detection circuit may be configured to detect presence of one or more cockroaches in the monitoring chamber by analyzing the electrical signal to determine presence of obstruction on a path of the light between the light emitter and the photoelectric transducer. The light emitter and the photoelectric transducer are each positioned and oriented such that the path of the light includes a turn at which the light is reflected before being received by the photoelectric transducer.

An example of a method for pest control is also provided. The method may include providing a cockroach monitor including a housing forming a monitoring chamber having one or more openings to allow cockroaches to enter the monitoring chamber and a ceiling to face backs of the cockroaches entering the monitoring chamber, emitting a light into the monitoring chamber, receiving the light, and automatically detecting presence of one or more cockroaches in the monitoring chamber by analyzing the received light to determine presence of obstruction on a path of the light, the path of the light including a turn at which the light is reflected before being received.

Another example of a pest control system including a cockroach monitor is also provided. The cockroach monitor may include a housing, a board having a sticky surface, and a cockroach detector. The housing may form a monitoring chamber having one or more openings to allow cockroaches to enter the monitoring chamber and a ceiling to face backs of the cockroaches entering the monitoring chamber. The board may be configured to be detachably attached to the ceiling to capture the cockroaches in the monitoring chamber by the backs of the cockroaches. The cockroach detector may be configured to detect a status of the board indicating one or more cockroaches trapped on the board when the board is attached to the ceiling. The cockroach detector may include a light emitter configured to emit a light, a photoelectric transducer configured to receive the light and to produce an electrical signal indicative of an intensity of the received light, and a detection circuit configured to detect the status of the board by analyzing the electrical signal to determine presence of obstruction on a path of the light between the light emitter and the photoelectric transducer.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

The drawings illustrate generally, by way of example, various embodiments discussed in the present document. The drawings are for illustrative purposes only and may not be to scale.

DETAILED DESCRIPTION

Figure 1:
FIG. 1 shows a block diagram illustrating an embodiment of a cockroach monitor.
Figure 1:
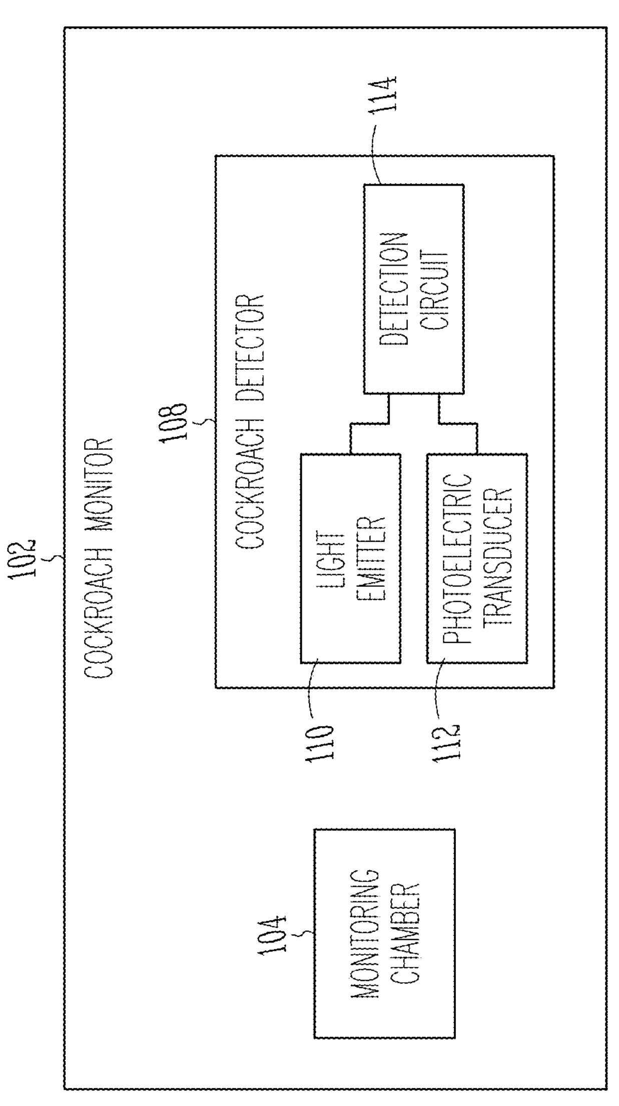

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The scope of the present invention is defined by the appended claims, along with the full scope of legal equivalents to which such claims are entitled.

The present subject matter relates to, among other things, a method and apparatus for monitoring presence of pests such as cockroaches. Monitoring presence and activities of cockroaches by manual inspections can be difficult, labor intensive, and/or ineffective. One way to monitor cockroaches is to use cockroach traps to capture cockroaches while using the number cockroach captured to monitor their presence and activities. This monitoring is only successful at conveying information as total number of cockroaches captured per period of time, with no context to when they were introduced to aid in root cause analysis. In an example, a cockroach trap includes a board having a sticky surface (also referred to as a sticky board or a glue board). Once deployed, the cockroach traps need to be frequently checked for effectiveness (e.g., whether any cockroaches are trapped), need for replacement (e.g., when the sticky board is lost, or when a substantial portion of the sticky board is covered by the trapped cockroaches), and/or signs of cockroach infestation. Such checking when performed manually can be labor intensive and costly. For example, for a pest control service provider providing customers with pest control services, using cockroach traps with sticky boards for eliminating cockroaches may require frequent visits to customer sites by field technicians and replacing the past traps at regular intervals to maintain effectiveness of cockroach control. The field technicians visually inspect the sticky boards at each visit of the customer site to determine, for example, whether each trap has captured any cockroaches, whether each trap needs to be replaced, and/or whether any signs of infestation are observed. However, such a process when performed manually may be costly and may also be unreliable when timing of cockroach capturing is needed for detecting early signs of cockroach infestation.

The present subject matter provides a pest control system that can automatically detect pests such as cockroaches entering a pest monitoring device and transmits detection and/or analysis information to a control center such as a network-based control center of the pest control service provider. The information can indicate, for example, pest presence in a location where cockroach monitors are deployed, need for replacing any cockroach monitors, indications of cockroach infestation, and/or need for adjusting a pest control strategy. When compared to a manual process for pest control, the present pest control system can increase effectiveness of cockroach control (e.g., by responding to any need for replacing deployed cockroach monitors and adjusting the cockroach eliminating strategy in a timely manner) while reducing the frequency of visits to customer sites by the field technicians. In various embodiments, each cockroach monitor can be with or without a sticky board, as determined based on a cockroach elimination strategy. For example, a cockroach monitor with a sticky board can capture cockroaches and monitoring cockroach presence and activities by tracking cockroaches trapped on the sticky board, and a cockroach monitor without a sticky board can monitor cockroach presence and activities by tracking cockroaches walking through it. In either case, results of the monitoring can be used to indicate a need for a further action in a process of eliminating cockroaches (e.g., by using chemical, electrical, and/or mechanical means), trend analysis, and/or predictive analytics of seasonal pest pressures.

FIG. 1 shows a block diagram illustrating an embodiment of a cockroach monitor 100 that includes a housing 102 and a cockroach detector 108. Housing 102 includes a monitoring chamber 104. In various embodiments, monitoring chamber is formed when the cockroach monitor is placed on a surface, with a portion of that surface functioning as a floor for monitoring chamber 104. Monitoring chamber 104 has one or more openings to allow cockroaches to enter it and a ceiling to face backs of the cockroaches entering it. The back of a cockroach is the side with wings of the cockroach. Cockroach detector 108 can detect presence of one or more cockroaches in monitoring chamber 104. Cockroach detector 108 can include a light emitter 110, a photoelectric transducer 112, and a detection circuit 114. Light emitter 110 can emit a light. Photoelectric transducer 112 can receive the light and produce an electrical signal indicative of an intensity of the received light. Detection circuit 114 can detect the presence of one or more cockroaches in monitoring chamber 104 by analyzing the electrical signal to determine presence of obstruction on a path of the light between the light source and the photoelectric transducer.

In various embodiments, light emitter 110 can emit a light, such as a white light (having a wavelength between 400 nm and 700 nm). In one embodiment, light emitter 110 includes one or more light-emitting diodes (LEDs). In various embodiments, photoelectric transducer 112 can include any light-sensitive electronic component that can receive the light and produce the electrical signal indicative of the intensity of the received light. The electrical signal can be a DC, AC, or pulse signal, with its voltage amplitude, current amplitude, and/or pulse frequency representing the intensity of the received light. In one embodiment, photoelectric transducer 112 one or more phototransistors (also known as light sensitive electrical resistors, or photoresistors, each having an electrical resistance inversely proportional to the intensity of the received light). Light emitter 110 and photoelectric transducer 112 can include one or more pairs of LED and phototransistor.

Detection circuit 114 can detect the presence of one or more cockroaches in monitoring chamber 104 according to a specified schedule (e.g., continuously, or periodically) and/or in response to commands received by cockroach monitor 100. Detection circuit 114 can transmit data indicating the detected presence of one or more cockroaches in monitoring chamber 104 to one or more recipient devices according to the specified schedule (e.g., periodically) and/or in response to a change in the detected presence of one or more cockroaches in monitoring chamber 104. In some embodiments, detection circuit 114 can track changes of the presence of one or more cockroaches in monitoring chamber 104 over time and generate an alarm indicating a need for manual check and/or replacement of cockroach monitor 100.

Figure 2:
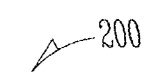
FIG. 2 shows a side view illustration of an embodiment of a cockroach monitor, such as an example of the cockroach monitor of FIG. 1.
Figure 2:
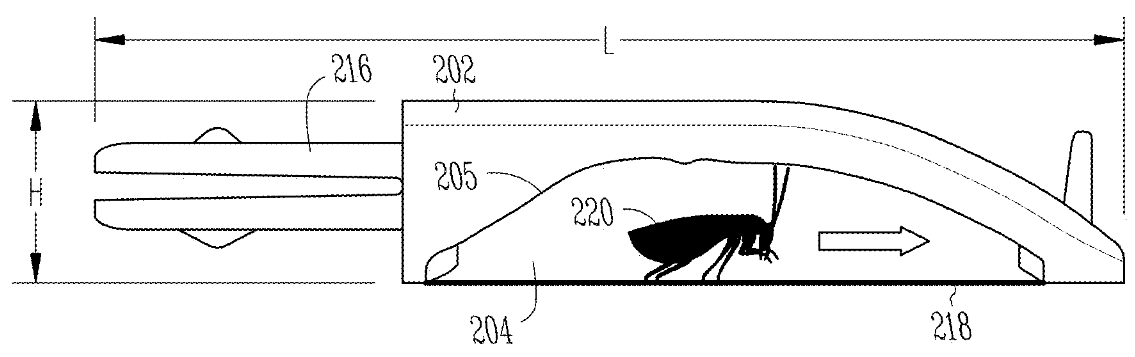

FIG. 2 shows a side view illustration of an embodiment of a cockroach monitor 200, which can represent an example of cockroach monitor 100 showing how it is implemented. Cockroach monitor 200 can be sized and shaped to be installed on various types of surface, to mimic cockroach harborages, and optionally to house a bait.

A housing 202 of cockroach monitor 200 can include a mounting structure 216 that allows cockroach monitor 200 to be mounted on a surface that can be horizontal, vertical, or at any angle. In various embodiments, the mounting structure of cockroach monitor 200 can include one or more adhesive strips and/or one or more screw holes. Monitoring chamber 204 can be shaped to mimic a cockroach harborage and include one or more openings (e.g., two openings with opposite sides of monitoring chamber open, in the illustrated embodiment) to allow cockroaches to enter. Monitoring chamber 204 has a ceiling 205 to face backs of the cockroaches entering it.

In the illustrated embodiment, when cockroach monitor 200 is placed on a surface, the portion of the surface under monitoring chamber 204 forms a "walking surface" 218 of monitoring chamber 204. In another embodiment, cockroach monitor 200 includes a floor functioning as walking surface 218. In one specific example, cockroach monitor 200 has a length ("L" in FIG. 2) of about 3.5 inches (89 mm), a height ("H" in FIG. 2) of about 0.5 inches (13 mm) and a width (or depth) of about 3 inches (76 mm).

Figure 3:
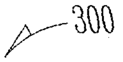
FIG. 3 shows a side view illustration of an embodiment of a cockroach monitor, such as an example of the cockroach monitor of FIG. 1 with a sticky board.
Figure 3:
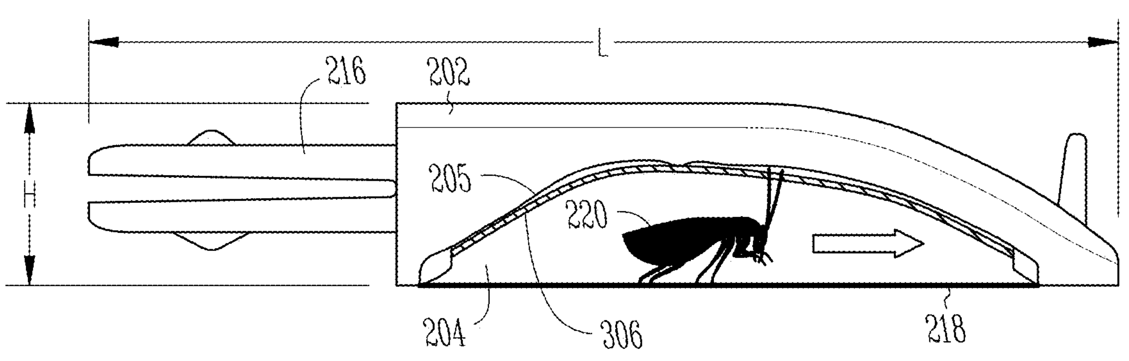

FIG. 3 shows a side view illustration of an embodiment of a cockroach monitor (also referred to as cockroach trap) 300, which can represent an example of cockroach monitor 100 with a sticky board. In the illustrated embodiment, cockroach 300 is cockroach monitor 200 with a sticky board 306 installed adjacent ceiling 205 in monitoring chamber 204. Sticky board 306 can be detachably attached to ceiling 205 to capture cockroach(es) 220 in monitoring chamber 204 by the backs of cockroach(es) 220. This placement of sticky board 306 in cockroach monitor 300, as illustrated in FIG. 3, can prevent trapped cockroaches from struggling free by using their legs. Sticky board 306 has a sticky surface coated with an adhesive and is to be detachably attached to ceiling 205 with the sticky surface facing the backs (winged sides) of cockroach(es) 220. Cockroaches entering monitoring chamber 204 are to be trapped on the overhead sticky board 306 by their backs when walking on walking surface 218. In various embodiments, sticky board 306 has a shape that substantially matches the shape of ceiling 205. In the illustrated embodiment, ceiling 205 is an arched ceiling, and stick board 306 is an arched sticky board having a shape substantially matching the shape of the arched ceiling.

A cockroach detector such as cockroach detector 108 can be embedded within cockroach monitor 200 or 300. Various examples of cockroach monitors using a cockroach monitor such as cockroach monitor 200 or 300 as a platform and including an embedded cockroach detector are discussed below with references to FIGS. 7-9. When a sticky board is used in the cockroach monitor, cockroach detector 108 can detect a status of the sticky board indicating one or more cockroaches trapped on the sticky board as indicated by the presence of the one or more cockroaches in monitoring chamber 104 (with monitoring chamber 204 being an example).

Figure 4:
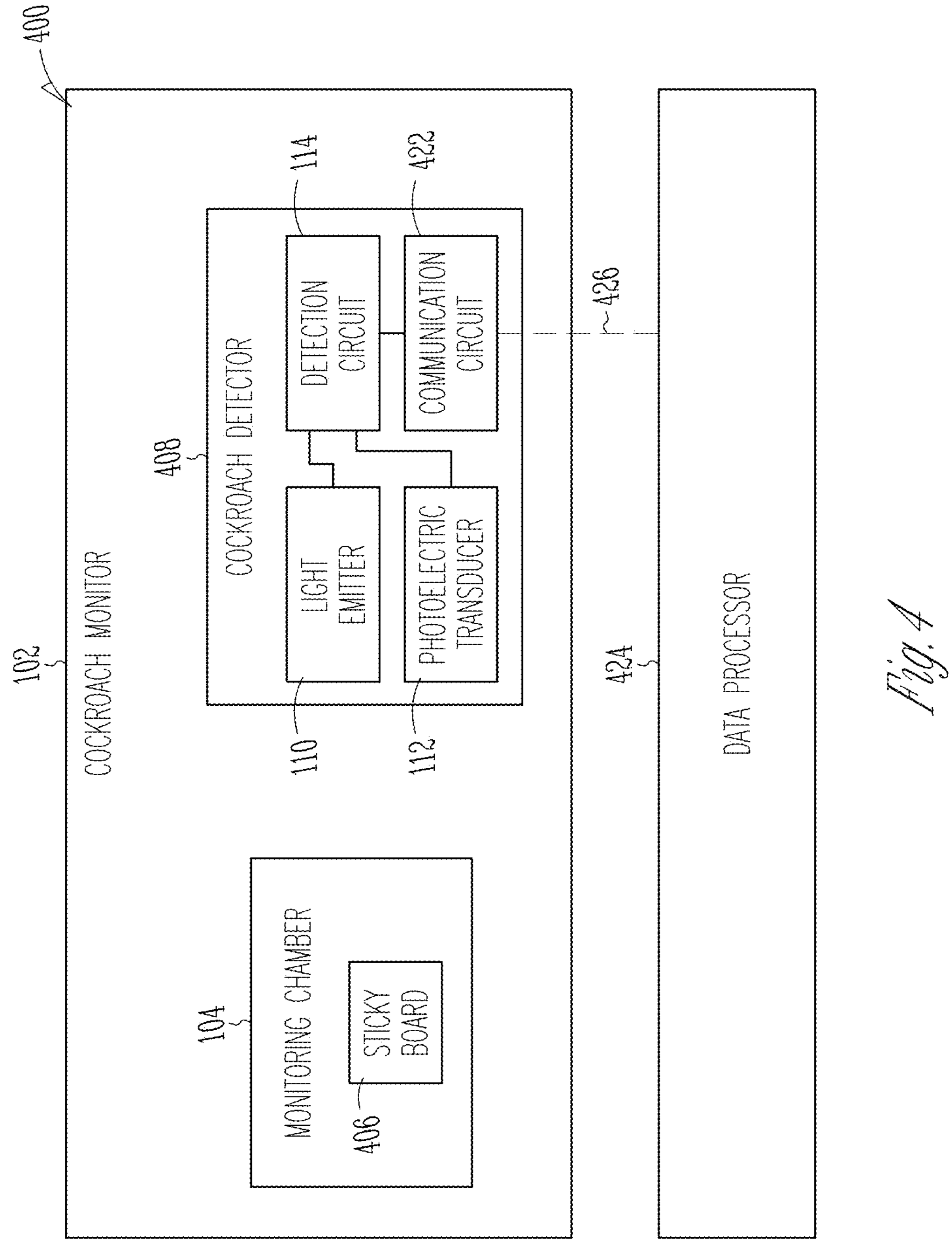
FIG. 4 shows a block diagram illustrating an embodiment of a cockroach monitor and a remote data processor.

FIG. 4 shows a block diagram illustrating an embodiment of a cockroach monitor 400 with a remote data processor 424. Cockroach monitor 400 includes housing 102, a cockroach detector 408, and optionally a sticky board 406. Cockroach detector 408 includes light emitter 110, photoelectric transducer 112, detection circuit 114, and a communication circuit 422. Cockroach monitor 400 is basically cockroach monitor 100 with communication capabilities provided by communication circuit 422. Cockroach monitor 400 can be implemented in form of, for example, cockroach monitor 200 (without sticky board 406) or cockroach monitor 300 (with sticky board 406).

Cockroach detector 408 can perform the functions of cockroach detector 108 as discussed above. When sticky board 406 is placed in monitoring chamber 104, detection circuit 114 can detect the presence of one or more cockroaches in monitoring chamber 104 as a status of sticky board 406 indicating one or more cockroaches trapped on it. Communication circuit 422 can transmit data indicating the detected presence of one or more cockroaches in monitoring chamber 104 or the status of sticky board 406 to one or more recipient devices in a pest control system.

In various embodiments, communication circuit 422 can transmit the data according to a schedule (e.g., periodically), in response to a specified event (e.g., a change in the detected presence of one or more cockroaches in monitoring chamber 104), and/or in response to a data acquisition commend received by cockroach monitor 400. In various embodiments in which cockroach monitor 400 is connected to a network such as a long range (LoRa) network or a Bluetooth low energy (BLE) mesh network, communication circuit 422 can function as a data transmitter and repeater.

Data processor 424 can be communicatively coupled to cockroach monitor 400 via a communication connection 426, such as a connection within the LoRa network or BLE mesh network. Data processor 424 can receive the data indicating the detected presence of one or more cockroaches in monitoring chamber 104 and analyze the received data. In various embodiments, data processor 424 can receive and analyze data transmitted from multiple instances of cockroach monitor 400.

Figure 5:
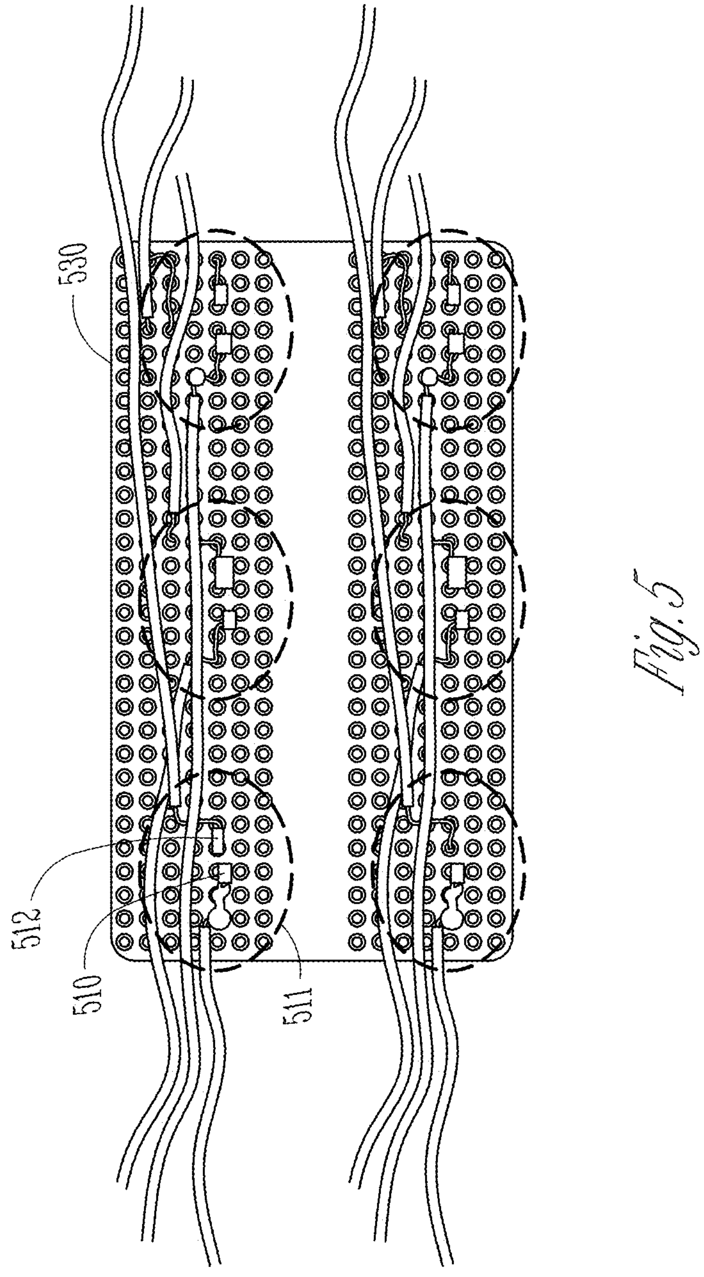
FIG. 5 shows an illustration of a prototype circuit board including multiple pairs of light emitter and photoelectric transducer.

FIG. 5 shows an illustration of a prototype circuit board (PCB) 530 including multiple pairs of light emitter and photoelectric transducer. PCB 530 as illustrated in FIG. 5 includes 6 light emitter-photoelectric transducer pairs 511 each including an LED 510 and a phototransistor 512. This prototype was tested using a white surface to reflect the light emitted from each LED 510 and a clear sticky board (clear glue coated on one side of a clear board substrate) placed in front of PCB 530 (such that it is between PCB and the white surface). Each respective phototransistor 512 received the reflected light and produced an electrical signal allowing for quantification of the intensity of the reflected light. Black foam pieces were placed on the white surface each as an obstruction (representing a cockroach) on the path of the light between each pair 511 of LED 510 and phototransistor 512. The obstruction (cockroach) scattered the light incident upon it due to its color and irregular geometry, thereby reducing the intensity of the reflected light as received by each photoresistor 512.

Figure 6:
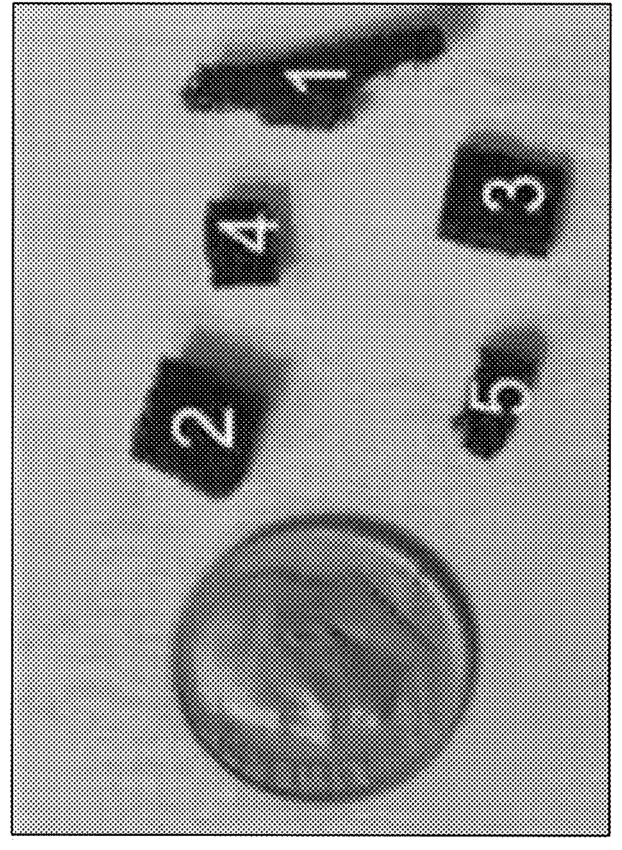
FIG. 6 shows an illustration of representations of cockroaches on a white surface for testing the circuit board of FIG. 5 and results of the testing.

FIG. 6 shows an illustration of 5 black foam pieces placed on a white surface for testing the prototype PCB 530 and also shows results of the test. The 5 foam pieces have different sizes and are labeled 1-5. A US dime (10-cent coin, diameter 0.705 inches/17.01 millimeters) is shown as a size reference. The table on the right side of FIG. 6 shows numerical values representing different intensities of the light reflected from the white surface and from various combination of the foam pieces 1-5 placed on the white surface. The results verified that the intensity of the light received by phototransistors 512 can represent the amount of obstruction on a sticky board.

Figure 7:
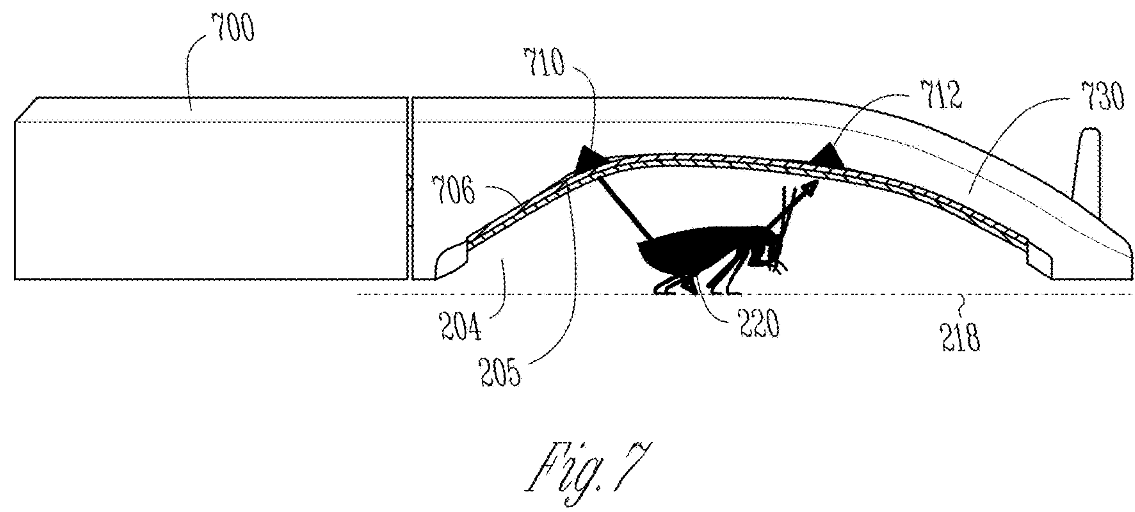
FIG. 7 shows a side view illustration of an embodiment of the cockroach monitor of FIG. 3 with a first example of light emitter-photoelectric transducer arrangement.
Figure 8:
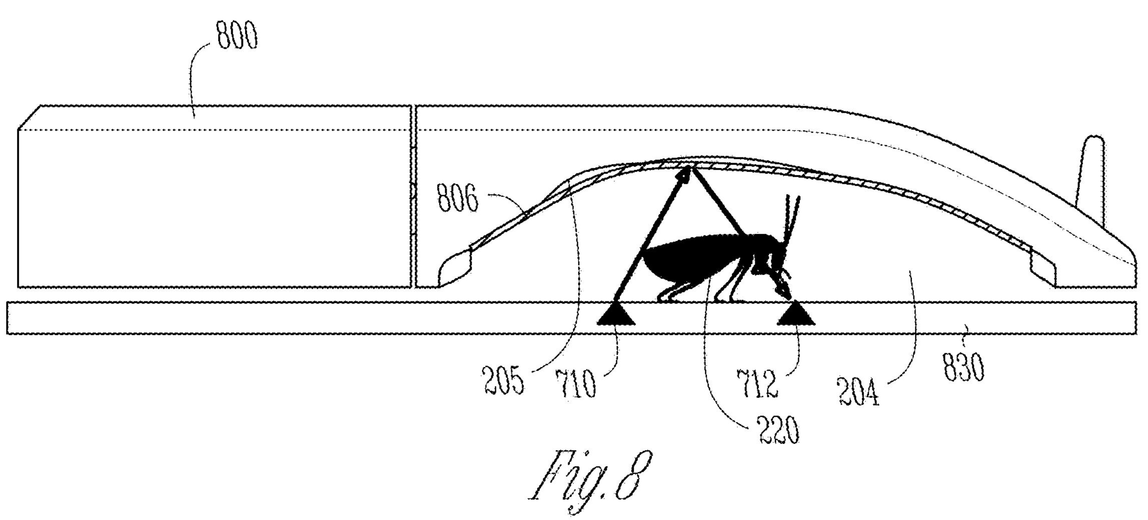
FIG. 8 shows a side view illustration of an embodiment of the cockroach monitor of FIG. 3 with a second example of light emitter-photoelectric transducer arrangement.
Figure 9:
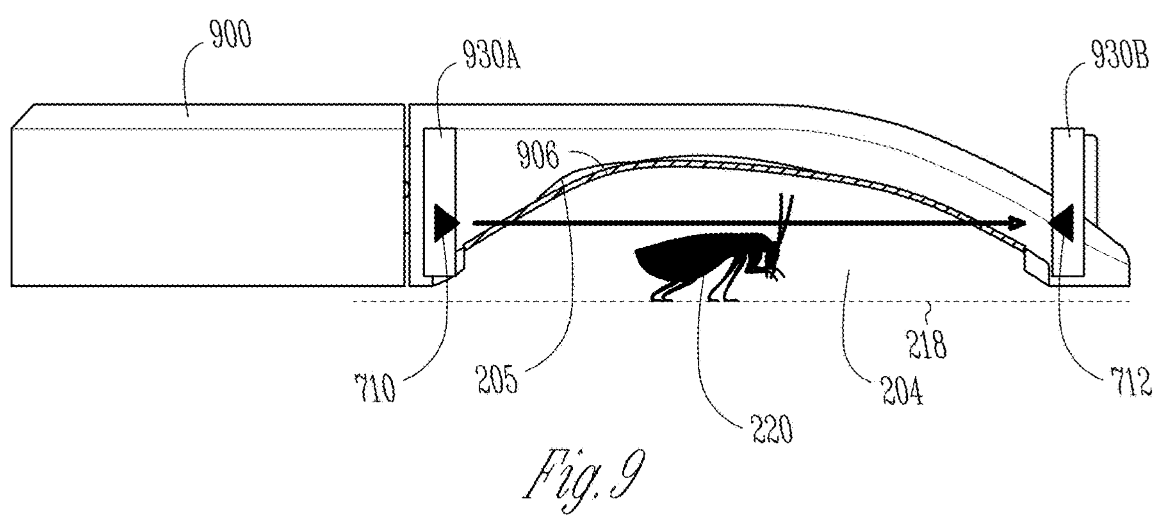
FIG. 9 shows a side view illustration of an embodiment of the cockroach monitor of FIG. 3 with a third example of light emitter-photoelectric transducer arrangement.

FIGS. 7-9 illustrate various embodiments of cockroach monitor 200 (with no sticky board) or cockroach monitor 300 (with sticky board) each with an example of arrangement of a pair of light emitter and photoelectric transducer in the cockroach monitor to provide cockroach monitor 200 or 300 with the capability of detecting presence of cockroaches in its monitoring chamber. While a sticky board is illustrated in each of FIGS. 7-9, the detection of cockroaches using the pair of light emitter and photoelectric transducer as shown in each of FIGS. 7-9 operates in the same manner with or without the sticky board. For example, if the light is to pass through the sticky board, the sticky board can be an optically transparent board. The pair of light emitter and photoelectric transducer as shown in each of FIGS. 7-9 can represent any number of light emitting components (e.g. LEDs) and any number of photoelectric transducer components (e.g., phototransistors) arranged in the cockroach monitor to provide sufficient detection coverage for the entire monitoring chamber or sticky board.

FIG. 7 shows a side view illustration of an embodiment of a cockroach monitor 700. Cockroach monitor 700 is an example of cockroach monitor 200 with a PCB 730 positioned adjacent ceiling 205 in monitoring chamber 204 or an example of cockroach monitor 300 with PCB 730 positioned between ceiling 205 and a sticky board 706 in monitoring chamber 204. Sticky board 706, which is an example of sticky board 306, can be detachably attached to ceiling 205, if desired. Sticky board 706 can be a transparent sticky board. For example, sticky board 706 can be a clear sticky board including a clear film substrate having a non-sticky surface to face PCB 730 and an opposite sticky surface coated with a clear adhesive. Being "transparent" or "clear" can mean having a level of optical transparency that allows for proper implementation of the optical cockroach detection concept according to the present subject matter. PCB 730 can be a flexible PCB that can be shaped to substantially matching the shape of ceiling 205 when it is positioned between ceiling 205 and sticky board 706. PCB 730 includes a light emitter 710 positioned and oriented to emit a light toward walking surface 218 and a photoelectric transducer 712 positioned and oriented to receive the light as reflected from walking surface 218. In various embodiments, light emitter 710 can include one or more LEDs, and photoelectric transducer 712 can include on or more phototransistors. The number of pairs of LEDs and phototransistors and their arrangement on PCB 730 are determined to cover the entire monitoring chamber 204 for cockroach detection.

PCB 730 can remain clean during usage of cockroach monitor 700 because it is not in contact of the cockroaches entering monitoring chamber 204. There is no walking surface transitions that may discourage cockroaches from entering monitoring chamber 204. The placement of PCB between ceiling 205 and sticky board 706 has no impact on the size of cockroach monitor 700 and minimal impact on the size (height) of monitoring chamber 204.

FIG. 8 shows a side view illustration of an embodiment of a cockroach monitor 800. Cockroach monitor 800 is an example of cockroach monitor 200 or 300 with a PCB 830 positioned on the bottom of the cockroach monitor to form a floor for monitoring chamber 204, with a portion functioning as the walking surface for cockroaches in monitoring chamber 204. A sticky board 806, which is an example of sticky board 306, can be detachably attached to ceiling 205, if desired. Sticky board 806 can be a nontransparent sticky board. For example, sticky board 806 can be a white sticky board including a white substrate having a non-sticky surface to face ceiling 205 and an opposite sticky surface coated with a clear or white adhesive. Being "nontransparent" or "white" can mean a background color with optical reflectance allowing for proper implementation of the optical cockroach detection concept according to the present subject matter. PCB 830 can be a rigid PCB attached to the bottom of the cockroach monitor. PCB 830 includes light emitter 710 positioned and oriented to emit a light toward sticky board 806 and photoelectric transducer 712 positioned and oriented to receive the light as reflected from sticky board 806. If sticky board 806 is not used, light emitter 710 is positioned and oriented to emit a light toward ceiling 205 (which can be a white surface) and photoelectric transducer 712 is positioned and oriented to receive the light as reflected from ceiling 205. The number of pairs of LEDs and phototransistors and their arrangement on PCB 830 are determined to cover the entire monitoring chamber 204 for cockroach detection.

FIG. 9 shows a side view illustration of an embodiment of a cockroach monitor 900. Cockroach monitor 900 is an example of cockroach monitor 200 or 300 with a pair of PCBs 930A and 930B positioned at opposite ends of monitoring chamber 204. A sticky board 906, which is an example of sticky board 306, can be detachably attached to ceiling 205, if desired. Sticky board 906 can be a transparent sticky board. For example, it can be a clear sticky board including a clear film substrate having a non-sticky surface to face ceiling 205 and an opposite sticky surface coated with a clear adhesive. PCB 930A and PCB 930B can each be a rigid PCB. PCB 930A includes light emitter 710 positioned and oriented to emit a light toward PCB 930B. PCB 930B includes photoelectric transducer 712 positioned and oriented to receive the light emitted from light emitter 710. In various embodiments, PCB 930A and PCB 930B can be positioned at any pair of opposite ends of monitoring chamber 204, such as at "horizontal ends" as shown in FIG. 9 or "vertical ends", with one of PCB 930A and PCB 930B attached to the bottom of cockroach monitor 900 to provide walking surface 218 and the other PCB attached to ceiling 205.

The number of pairs of LEDs and phototransistors and their arrangement on PCBs 930A and 930B are determined to cover the entire monitoring chamber 204 for cockroach detection. In cockroach monitor 900, light emitter 710 and photoelectric transducer 712 may need more pairs of LED and phototransistor to cover monitoring chamber 204, while the light emitter-photoelectric transducer arrangement can provide more measurement control and consistency, when compared with cockroach monitors 700 and 800.

Figure 10:
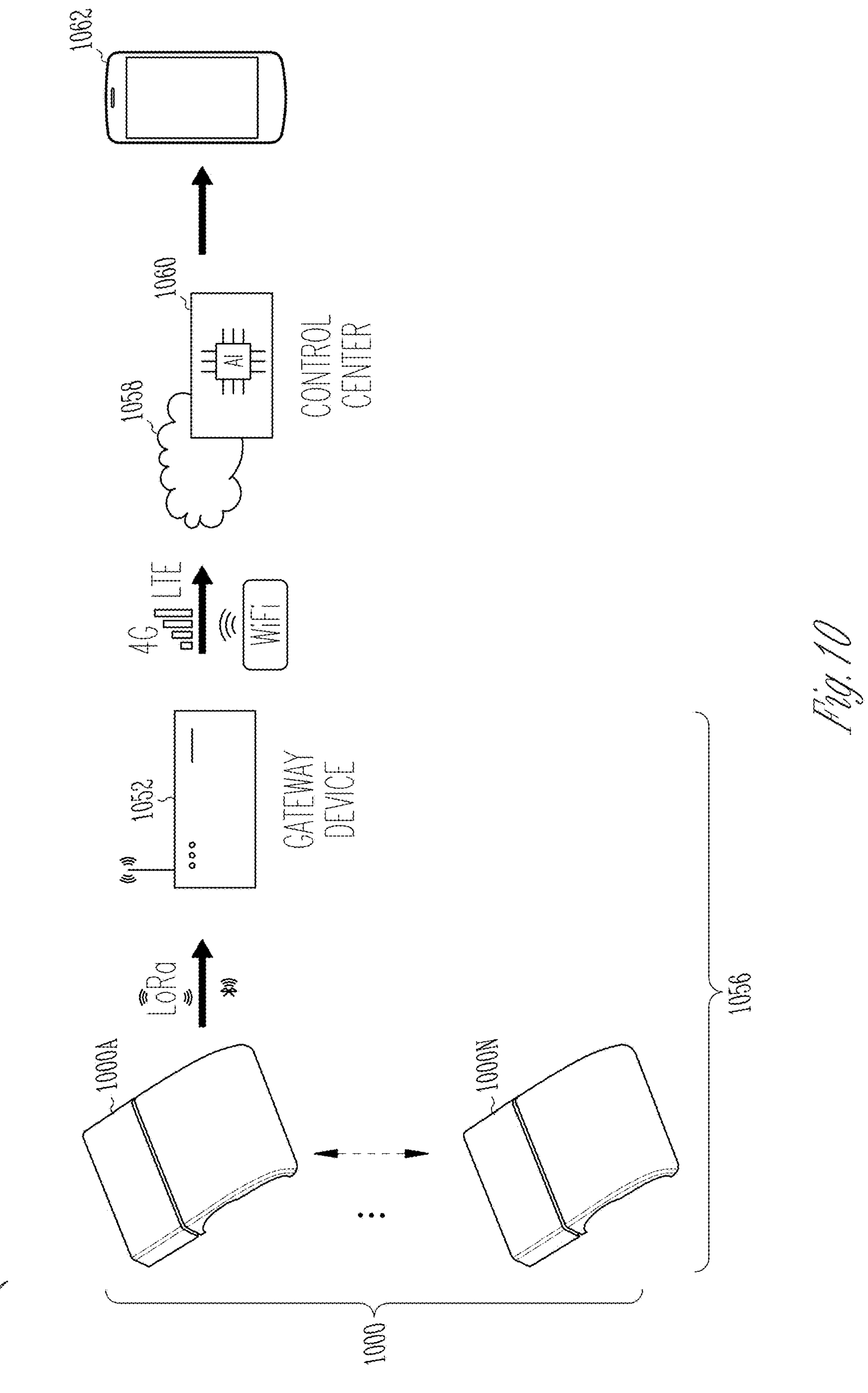
FIG. 10 shows a block diagram illustrating an embodiment of a pest control system including cockroach monitors.

FIG. 10 shows a block diagram illustrating an embodiment of a pest control system 1050. Pest control system 1050 includes multiple cockroach monitors 1000 (1000A-1000N), a gateway device 1052 communicating with pest control devices 1000 using a private edge network 1056 such as a LoRa network or a BLE mesh network, a control center 1060 on a network 1058 that communicates with gateway device 1052, and a mobile device 1062 (e.g., a smartphone) that communicates with network 1058 and gateway device 1052. Mobile device 1062 can be used, for example, to provision nodes to establish a BLE mesh network as private edge network 1056, with each of cockroach monitors 1000A-1000N at a source node transmitting data and gateway device 1052 at a destination node receiving data. In various embodiments, mobile device 1062 can be configured to communicate with each of cockroach monitors 1000 directly, for example to control their operation and/or to receive from them information related to the presence of one or more cockroaches detected in each cockroach monitor.

Cockroach monitors 1000 can include cockroach monitors each including a cockroach detector to monitor presence of one or more cockroaches in the respective monitoring chamber and generate data including information indicative the results of monitoring. Examples of cockroach monitors 1000 include cockroach monitors 100, including its various embodiments discussed herein (e.g., cockroach monitors 200, 300, 400, 700, 800, and 900).

Gateway device 1052 can discover cockroach monitors 1000 in its vicinity and receive the data including information indicative status of these cockroach monitors including presence of one or more cockroaches in their monitoring chambers. In various embodiments, the information indicative the presence of one or more cockroaches in the monitoring chamber of each of cockroach monitors 1000 can be acquired and transmitted to gateway device 1052 according to a schedule, such as on a periodic basis. Gateway device 1052 can analyze the received data by edge computing and transmit the results of analysis to control center 1060, for example via WiFi or a cellular network. In various embodiments, gateway device 1052 and/or mobile device 1062 can each discover cockroach monitors 1000 in its vicinity and receive the data including information indicative status these cockroach monitors including presence of one or more cockroaches in their monitoring chambers. In some embodiments, a mobile device can be configured to function as gateway device 1052. In various embodiments, gateway device 1052 and/or mobile device 1062 can analyze the information indicative status of these cockroach monitors and generating one or more notifications and/or alarms when the outcome of the analyze indicates a need for one or more actions, such as an indication for replacing one or more of the cockroach monitors or an indicating of a cockroach infestation. For example, a notification or alarm can be produced in response to the number of cockroaches in a cockroach monitor exceeds a threshold number.

Pest control system 1050 is illustrated in FIG. 10 as an example rather than a limitation of an application of the present subject matter. In various embodiments, pest control system 1050 can include one or more gateway devices each communicating with multiple pest control devices including cockroach monitors using the private edge network. For example, control center 1060 can be in a pest control service provider's network that communicates with multiple customer sites each having one or more gateway devices communicatively coupled to a system of strategically positioned pest control devices using one or more private edge networks. In various embodiments, pest control system 1050 can be part of a larger facilities management system in which the one or more gateway devices in each customer's site communicatively coupled various types of devices using one or more BLE mesh networks. The various types of devices can include, for example, pest control devices, warewashing devices, fire suppression systems, and the like in a food service establishment, or pest control devices, warewashing devices, fire suppression systems, office appliances, water safety devices, boilers, laundry machines, housekeeping appliances, cooling towers, pool and spa, and the like in a lodging facility.

Figure 11:
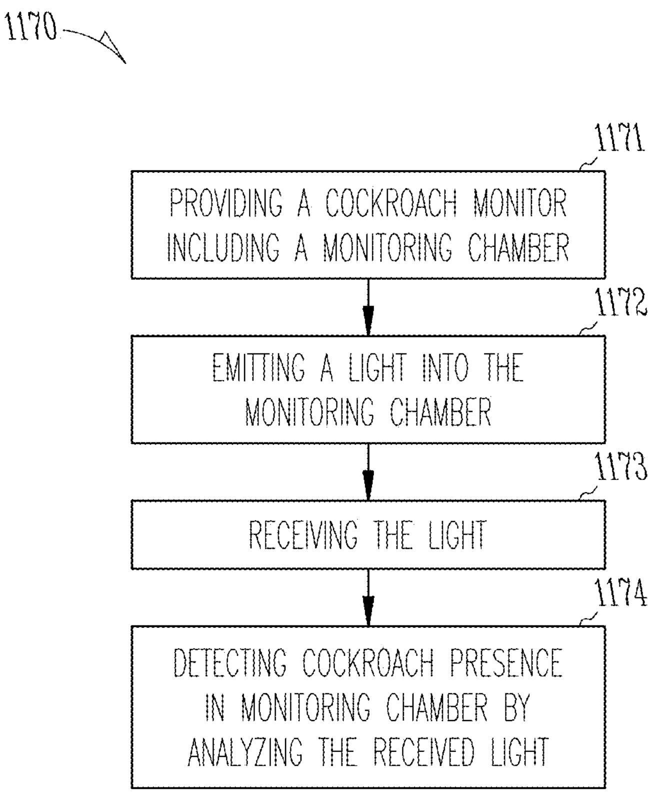
FIG. 11 shows a flow chart illustrating an embodiment of a method for pest control including detecting cockroaches in a cockroach monitor.

FIG. 11 shows a flow chart illustrating an embodiment of a method 1170 for pest control including detecting cockroaches in a cockroach monitor. Method 1170 can be performed using cockroach monitor 100, including its various embodiments in which a sticky board may not be used, as discussed herein.

At 1171, a cockroach monitor is provided. The cockroach monitor includes a housing that includes a monitoring chamber. The monitoring chamber has one or more openings to allow cockroaches to enter it and a ceiling to face backs of the cockroaches entering it. In various embodiments, the monitoring chamber is formed when the cockroach monitor is placed on a surface, with a portion of that surface functioning as a floor for the monitoring chamber.

At 1172, a light is emitted into the monitoring chamber using a light emitter. The light emitter can include one or more LEDs.

At 1173, the light is received using a photoelectric transducer. The photoelectric transducer can include one or more phototransistors.

At 1174, presence of one or more cockroaches in the monitoring chamber is automatically detected by analyzing the received light to determine presence of obstruction on a path of the light. In various embodiments, the path of the light from the light emitter to the photoelectric transducer can be straight (i.e., without reflection) or include one or more turns (i.e., one or more reflections). In various embodiments, method 1170 can be performed with each of multiple cockroach monitors. The detected presence of one or more cockroaches in the monitoring chamber of each cockroach monitor can be transmitted to a gateway device communicatively coupled to the multiple cockroach monitors. The transmission of the detected presence of one or more cockroaches in the monitoring chamber from each cockroach monitor can occur according to a schedule, such as on a periodic basis, in response to a data acquisition command received by the cockroach monitor, and/or in response to a change in the detected presence of one or more cockroaches in the monitoring chamber of the cockroach monitor. In various embodiments, changes of the presence of one or more cockroaches in the monitoring chamber can be tracked for each cockroach monitor over time, such as using the gateway device. Such changes of the detected presence of one or more cockroaches in the monitoring chamber when tracked for multiple cockroach monitors placed in a facility can be used as an indication of a trend of presence of cockroaches in the facility.

In one embodiment, providing the cockroach monitor at 1171 includes placing a flexible circuit board adjacent the ceiling in the monitoring chamber. The flexible circuit board includes the light emitter to emit the light and the photoelectric transducer to receive the light. Emitting the light at 1172 includes emitting the light toward the surface the cockroach monitor is placed. Receiving the light at 1173 includes receiving the light reflected from that surface.

In another embodiment, providing the cockroach monitor at 1171 attaching a circuit board to a bottom of the cockroach monitor to form a floor facing the ceiling. The circuit board can be a rigid circuit board and includes the light emitter to emit the light and the photoelectric transducer to receive the light. Emitting the light at 1172 includes emitting the light toward the ceiling. Receiving the light at 1273 includes receiving the light reflected from the ceiling.

In yet another embodiment, providing the cockroach monitor at 1171 includes placing a first circuit board at one end of the monitoring chamber and placing a second circuit board at an opposite end of the monitoring chamber. The first circuit board includes the light emitter to emit the light. The second circuit board includes the photoelectric transducer to receive the light. Emitting the light at 1272 includes emitting the light toward the second circuit board. Receiving the light at 1273 includes receiving the light directly from the light emitter on the first circuit board.

Figure 12:
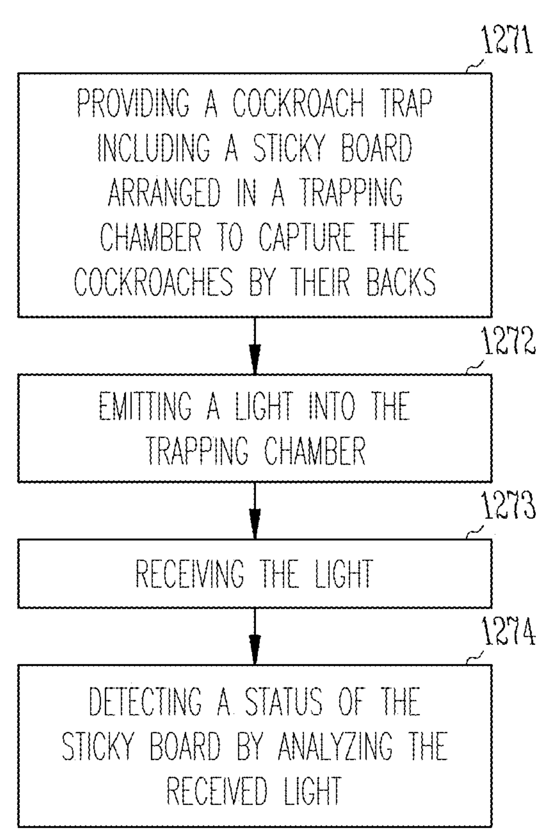
FIG. 12 shows a flow chart illustrating an embodiment of a method for pest control including detecting cockroaches in a cockroach trap.

FIG. 12 shows a flow chart illustrating an embodiment of a method 1270 for pest control including detecting cockroaches in a cockroach trap. Method 1270 can be performed using a cockroach trap, such as a cockroach trap formed by including a sticky board in cockroach monitor 100, including its various embodiments discussed herein.

At 1271, a cockroach trap is provided. The cockroach trap includes a housing that forms a monitoring chamber when the cockroach trap is placed on a surface. The monitoring chamber has one or more openings to allow cockroaches to enter it and a ceiling to face backs of the cockroaches entering it. A sticky board is detachably attached to the ceiling to capture the cockroaches in the monitoring chamber by their backs. In various embodiments, the monitoring chamber is formed when the cockroach monitor is placed on a surface, with a portion of that surface functioning as a floor for the monitoring chamber.

At 1272, a light is emitted into the monitoring chamber using a light emitter. The light emitter can include one or more LEDs.

At 1273, the light is received using a photoelectric transducer. The photoelectric transducer can include one or more phototransistors.

At 1274, a status of the sticky board is automatically detected by analyzing the received light to determine presence of obstruction on a path of the light. The status indicates one or more cockroaches trapped on the sticky board. In various embodiments, the path of the light from the light emitter to the photoelectric transducer can be straight (i.e., without reflection) or include one or more turns (i.e., one or more reflections).

In various embodiments, method 1270 can be performed with each of multiple cockroach traps. The detected status of the sticky board of each cockroach trap can be transmitted to a gateway device communicatively coupled to the multiple cockroach traps. The transmission of the detected status from each cockroach trap can occur according to a schedule, such as on a periodic basis, in response to a data acquisition command received by the cockroach trap, and/or in response to a change in the detected status of the sticky board of the cockroach trap. In various embodiments, changes of the status of the sticky board can be tracked for each cockroach trap over time, such as using the gateway device. Such changes of the status of the sticky board when tracked for multiple cockroach traps placed in a facility can be used as an indication of a trend of presence of cockroaches in the facility. The status of the sticky board and/or its changes when tracked for a cockroach trap can indicate degradation of the sticky board and other surfaces of that cockroach trap and hence, a need for replacing the sticky board or replacing the cockroach trap.

In one embodiment, providing the cockroach trap at 1271 includes providing a transparent sticky board to be the sticky board and placing a flexible circuit board between the ceiling and the sticky board. The flexible circuit board includes the light emitter to emit the light and the photoelectric transducer to receive the light. Emitting the light at 1272 includes emitting the light toward the surface the cockroach trap is placed. Receiving the light at 1273 includes receiving the light reflected from that surface.

In another embodiment, providing the cockroach trap at 1271 includes providing a nontransparent, light-reflecting sticky board to be the sticky board and attaching a circuit board to a bottom of the cockroach trap to form a floor facing the ceiling. The circuit board can be a rigid circuit board and includes the light emitter to emit the light and the photoelectric transducer to receive the light. Emitting the light at 1272 includes emitting the light toward the sticky board. Receiving the light at 1273 includes receiving the light reflected from the sticky board.

In yet another embodiment, providing the cockroach trap at 1271 includes providing a transparent sticky board to be the sticky board, placing a first circuit board at one end of the monitoring chamber, and placing a second circuit board at an opposite end of the monitoring chamber. The first circuit board includes the light emitter to emit the light. The second circuit board includes the photoelectric transducer to receive the light. Emitting the light at 1272 includes emitting the light toward the second circuit board. Receiving the light at 1273 includes receiving the light directly from the light emitter on the first circuit board.

Figure 13:
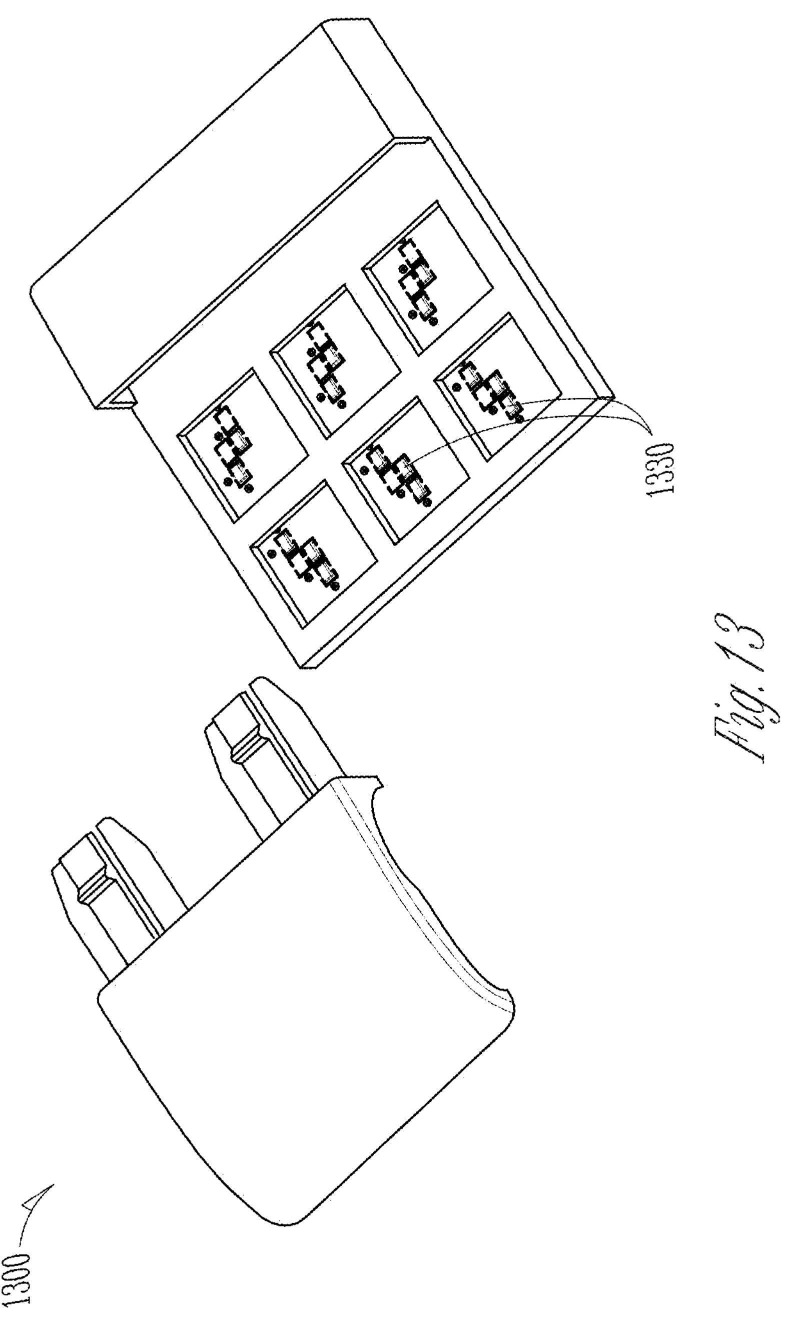
FIG. 13 shows an illustration of an example implementation of the embodiment of the cockroach monitor of FIG. 8.

FIG. 13 shows an illustration of a cockroach monitor 1300 being example implementation of cockroach monitor 800. Shown in FIG. 13 is an assembly for cockroach monitor 1300 with a roof portion of its housing open to show a PCB 1330 including 6 LED-phototransistor pairs.

Figure 14:
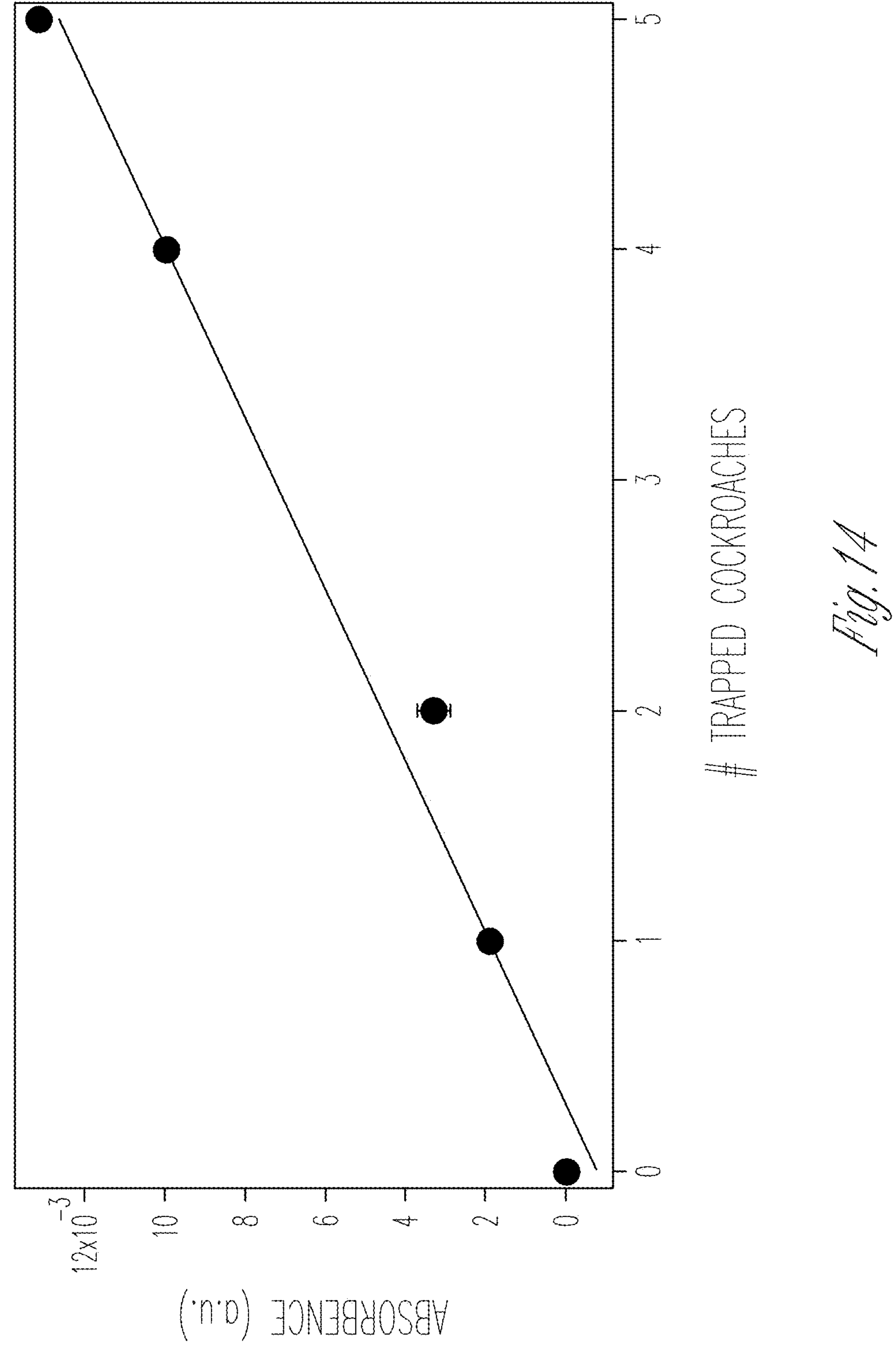
FIG. 14 shows an example of results from testing the cockroach monitor of FIG. 13.

FIG. 14 shows an example of results from testing cockroach monitor 1300 with actual cockroaches. The result is shown as a graph plotting absorbance (in absorbance units, A.U.) against the number of cockroaches present in the monitoring chamber (e.g., trapped on the sticky board) of cockroach monitor 1300. The absorbance is a measure of the amount of light absorbed by the cockroaches and hence not received by the phototransistors. The graph shows that the absorbance measured using cockroach monitor 1300 is substantially directly proportional to the number of cockroaches present in the monitoring chamber.

Some non-limiting examples (Examples 1-24) of the present subject matter are provided as follows:

In Example 1, a pest control system includes a cockroach monitor. The cockroach monitor may include a housing and a cockroach detector. The housing may form a monitoring chamber having one or more openings to allow cockroaches to enter the monitoring chamber and a ceiling to face backs of the cockroaches entering the monitoring chamber. The cockroach detector may include a light emitter, a photoelectric transducer, and a detection circuit. The light emitter is configured to emit a light. The photoelectric transducer is configured to receive the light and to produce an electrical signal indicative of an intensity of the received light. The detection circuit may be configured to detect presence of one or more cockroaches in the monitoring chamber by analyzing the electrical signal to determine presence of obstruction on a path of the light between the light emitter and the photoelectric transducer. The light emitter and the photoelectric transducer are each positioned and oriented such that the path of the light includes a turn at which the light is reflected before being received by the photoelectric transducer.

In Example 2, the subject matter of Example 1 may optionally be configured such that the photoelectric transducer includes a phototransistor.

In Example 3, the subject matter of any one or a combination of Examples 1 and 2 may optionally be configured such that the light emitter includes a light-emitting diode (LED).

In Example 4, the subject matter of Example 3 may optionally be configured such that the cockroach detector includes multiple pairs of the phototransistor and the LED.

In Example 5, the subject matter of any one or any combination of Examples 1 to 4 may optionally be configured such that the cockroach monitor includes a circuit board adjacent the ceiling in the monitoring chamber. The circuit board includes the light emitter and the photoelectric transducer. The light emitter is positioned and oriented to emit the light toward a surface on which the cockroach is placed. The photoelectric transducer is positioned and oriented to receive the light reflected from the surface on which the cockroach monitor is placed.

In Example 6, the subject matter of any one or any combination of Examples 1 to 4 may optionally be configured such that the cockroach monitor includes a circuit board attached to a bottom of the cockroach monitor to form a floor facing the ceiling. The circuit board includes the light emitter and the photoelectric transducer. The light emitter is positioned and oriented to emit the light toward the ceiling. The photoelectric transducer is positioned and oriented to receive the light reflected from the ceiling.

In Example 7, the subject matter of any one or any combination of Examples 1 to 4 may optionally be configured such that the cockroach monitor further includes a board having a sticky surface. The board is configured to be detachably attached to the ceiling to capture the cockroaches in the monitoring chamber by the backs of the cockroaches using the sticky surface.

In Example 8, the subject matter of Example 7 may optionally be configured such that the board includes a transparent board, and the cockroach monitor includes a circuit board placed between the ceiling and the board. The circuit board includes the light emitter and the photoelectric transducer. The light emitter is positioned and oriented to emit the light toward a surface on which the cockroach is placed. The photoelectric transducer is positioned and oriented to receive the light reflected from the surface on which the cockroach monitor is placed.

In Example 9, the subject matter of Example 7 may optionally be configured such that the board includes a nontransparent, light-reflecting board, and the cockroach monitor includes a circuit board attached to a bottom of the cockroach monitor to form a floor facing the ceiling. The circuit board includes the light emitter and the photoelectric transducer. The light emitter is positioned and oriented to emit the light toward the board. The photoelectric transducer is positioned and oriented to receive the light reflected from the board.

In Example 10, a method for pest control is provided. The method may include providing a cockroach monitor including a housing forming a monitoring chamber having one or more openings to allow cockroaches to enter the monitoring chamber and a ceiling to face backs of the cockroaches entering the monitoring chamber, emitting a light into the monitoring chamber, receiving the light, and automatically detecting presence of one or more cockroaches in the monitoring chamber by analyzing the received light to determine presence of obstruction on a path of the light, the path of the light including a turn at which the light is reflected before being received.

In Example 11, the subject matter of Example 10 may optionally further include transmitting the detected presence of one or more cockroaches in the monitoring chamber to at least one of a gateway device or a mobile device. The at least one of the gateway device or the mobile device are communicatively coupled to multiple cockroach monitors each being an instance of the cockroach monitor.

In Example 12, the subject matter of Example 11 may optionally further include producing a notification or alarm based on the detected presence of one or more cockroaches in the monitoring chamber using the at least one of the gateway device or the mobile device.

In Example 13, the subject matter of providing the cockroach monitor as found in any one or any combination of Examples 10 to 12 may optionally include placing a circuit board adjacent the ceiling in the monitoring chamber. The circuit board includes a light emitter to emit the light and a photoelectric transducer to receive the light. The subject matter of emitting the light as found in any one or any combination of Examples 10 to 12 may optionally include emitting the light toward the surface on which the cockroach monitor is placed. The subject matter of receiving the light as found in any one or any combination of Examples 10 to 12 may optionally include receiving the light reflected from the surface on which the cockroach monitor is placed.

In Example 14, the subject matter of providing the cockroach monitor as found in Example 13 may optionally include detachably attaching a transparent board having a sticky surface to the ceiling to capture the cockroaches in the monitoring chamber by the backs of the cockroaches using the sticky surface. The subject matter of placing the circuit board adjacent the ceiling in the monitoring chamber as found in Example 13 may optionally include placing the circuit board between the ceiling and the board.

In Example 15, the subject matter of providing the cockroach monitor as found in any one or any combination of Examples 10 to 12 may optionally include attaching a circuit board to a bottom of the cockroach monitor to form a floor facing the ceiling. The circuit board includes a light emitter to emit the light and a photoelectric transducer to receive the light. The subject matter of emitting the light as found in any one or any combination of Examples 10 to 12 may optionally include emitting the light includes emitting the light toward the ceiling. The subject matter of receiving the light as found in any one or any combination of Examples 10 to 12 may optionally include receiving the light reflected from the ceiling.

In Example 16, the subject matter of providing the cockroach monitor as found in any one or any combination of Examples 10 to 12 may optionally include attaching detachably attaching a nontransparent, light-reflecting board having a sticky surface to the ceiling to capture the cockroaches in the monitoring chamber by the backs of the cockroaches using the sticky surface and attaching a circuit board to a bottom of the cockroach monitor to form a floor facing the ceiling. The circuit board includes a light emitter to emit the light and a photoelectric transducer to receive the light. The subject matter of emitting the light as found in any one or any combination of Examples 10 to 12 may optionally include emitting the light toward the board. The subject matter of receiving the light as found in any one or any combination of Examples 10 to 12 may optionally include receiving the light reflected from the board.

In Example 17, a pest control system includes a cockroach monitor. The cockroach monitor may include a housing, a board having s sticky surface, and a cockroach detector. The housing may form a monitoring chamber having one or more openings to allow cockroaches to enter the monitoring chamber and a ceiling to face backs of the cockroaches entering the monitoring chamber. The board may be configured to be detachably attached to the ceiling to capture the cockroaches in the monitoring chamber by the backs of the cockroaches. The cockroach detector may be configured to detect a status of the board indicating one or more cockroaches trapped on the board when the board is attached to the ceiling. The cockroach detector may include a light emitter configured to emit a light, a photoelectric transducer configured to receive the light and to produce an electrical signal indicative of an intensity of the received light, and a detection circuit configured to detect the status of the board by analyzing the electrical signal to determine presence of obstruction on a path of the light between the light emitter and the photoelectric transducer.

In Example 18, the subject matter of Example 17 may optionally be configured such that the light emitter includes multiple light-emitting diodes, and the photoelectric transducer includes multiple phototransistors.

In Example 19, the subject matter of any one or a combination of Examples 17 and 18 may optionally be configured such that the ceiling includes an arched ceiling, and the board includes an arched board having a shape configured to substantially match the shape of the arched ceiling.

In Example 20, the subject matter of any one or any combination of Examples 17 to 19 may optionally be configured such that the board includes a transparent board, and the cockroach monitor includes a circuit board placed between the ceiling and the board. The circuit board includes the light emitter and the photoelectric transducer. The light emitter is positioned and oriented to emit the light toward a surface on which the cockroach is placed. The photoelectric transducer is positioned and oriented to receive the light reflected from the surface on which the cockroach monitor is placed.

In Example 21, the subject matter of any one or any combination of Examples 17 to 19 may optionally be configured such that the board includes a nontransparent, light-reflecting board, and the cockroach monitor includes a circuit board attached to a bottom of the cockroach monitor to form a floor facing the ceiling. The circuit board includes the light emitter and the photoelectric transducer. The light emitter is positioned and oriented to emit the light toward the board. The photoelectric transducer is positioned and oriented to receive the light reflected from the board.

In Example 22, the subject matter of any one or any combination of Examples 17 to 19 may optionally be configured such that the board includes a transparent board, and the cockroach monitor includes a first circuit board placed at one end of the monitoring chamber and a second circuit board placed at an opposite end of the monitoring chamber. The first circuit board includes the light emitter positioned and oriented to emit the light toward the second circuit board. The second circuit board includes the photoelectric transducer positioned and oriented to receive directly the light emitted from the light emitter.

In Example 23, the subject matter of any one or any combination of Examples 1 to 9, or the subject matter of any one or any combination of Examples 17 to 22, may optionally be configured to further include at least one of a gateway device or a mobile device each configured to be communicatively coupled to the cockroach monitor.

In Example 24, the subject matter of Example 23 may optionally be configured to further include a network-based control center configured to be communicatively coupled to the at least one of the gateway device or the mobile device.

The foregoing examples are not limiting or exclusive, and the scope of the present subject matter is to be determined by the specification as a whole, including the claims and drawings.

The above description includes references to the accompanying drawings, which form a part of the detailed description. The drawings show, by way of illustration, varying embodiments in which the invention can be practiced. The application also refers to "examples." Such examples can include elements in addition to those shown or described. The foregoing examples are not intended to be an exhaustive or exclusive list of examples and variations of the present subject matter.

This application is intended to cover adaptations or variations of the present subject matter. It is to be understood that the above description is intended to be illustrative, and not restrictive. The scope of the present invention should be determined with reference to the appended claims, along with the full scope of legal equivalents to which such claims are entitled.

What is claimed is:

1. A pest control system, comprising:

a cockroach monitor including:

a housing forming a monitoring chamber having one or more openings to allow cockroaches to enter the monitoring chamber and a ceiling to face backs of the cockroaches entering the monitoring chamber;

a transparent board having a sticky surface, the transparent board configured to be detachably attached to the ceiling to capture the cockroaches in the monitoring chamber by the backs of the cockroaches using the sticky surface; and a cockroach detector including:

a light emitter configured to emit a light, the light emitter positioned and oriented to emit the light toward a surface on which the cockroach monitor is placed;

a photoelectric transducer configured to receive the light and to produce an electrical signal indicative of an intensity of the received light, the photoelectric transducer positioned and oriented to receive the light reflected from the surface on which the cockroach monitor is placed;

a detection circuit configured to detect presence of one or more cockroaches in the monitoring chamber by analyzing the electrical signal to determine presence of obstruction on a path of the light between the light emitter and the photoelectric transducer; and a circuit board placed between the ceiling and the transparent board, the circuit board including the light emitter and the photoelectric transducer, wherein the light emitter and the photoelectric transducer are each positioned adjacent the ceiling and oriented such that the path of the light includes a turn at which the light is reflected before being received by the photoelectric transducer.

2. The system of claim 1, wherein the photoelectric transducer comprises a phototransistor.

3. The system of claim 2, wherein the light emitter comprises a light-emitting diode (LED).

4. The system of claim 3, wherein the cockroach detector comprises multiple pairs of the phototransistor and the LED.

5. The system of claim 1, wherein the circuit board comprises a flexible circuit board.

6. The system of claim 1, wherein the circuit board comprises a flexible circuit board configured to be shaped to substantially matching a shape of the ceiling when being positioned between the ceiling and the board.

7. The system of claim 1, wherein the detection circuit is configured to detect the presence of one or more cockroaches in the monitoring chamber according to a specified schedule.

8. The system of claim 7, wherein the cockroach monitor is configured to receive commands, and the detection circuit is configured to detect the presence of one or more cockroaches in the monitoring chamber in response to the received commands.

9. The system of claim 8, wherein the detection circuit is configured track changes of the presence of one or more cockroaches in the monitoring chamber over time and to generate an alarm indicating a need for at least one of manual check or replacement of the cockroach monitor.

10. A method for pest control, comprising:

providing a cockroach monitor including a housing forming a monitoring chamber having one or more openings to allow cockroaches to enter the monitoring chamber and a ceiling to face backs of the cockroaches entering the monitoring chamber;

emitting a light from a location adjacent the ceiling into the monitoring chamber, the light emitted toward a surface on which the cockroach monitor is placed;

receiving the light at another location adjacent the ceiling, the received light reflected from the surface on which the cockroach monitor is placed; and automatically detecting presence of one or more cockroaches in the monitoring chamber by analyzing the received light to determine presence of obstruction on a path of the light, the path of the light including a turn at which the light is reflected before being received, wherein providing the cockroach monitor comprises:

detachably attaching a transparent board having a sticky surface to the ceiling to capture the cockroaches in the monitoring chamber by the backs of the cockroaches using the sticky surface; and placing a circuit board between the ceiling and the transparent board, the circuit board including a light emitter to emit the light and a photoelectric transducer to receive the light.

11. The method of claim 10, further comprising transmitting the detected presence of one or more cockroaches in the monitoring chamber to at least one of a gateway device or a mobile device, the at least one of the gateway device or the mobile device communicatively coupled to multiple cockroach monitors each being an instance of the cockroach monitor.

12. The method of claim 11, further comprising producing a notification or alarm based on the detected presence of one or more cockroaches in the monitoring chamber using the at least one of the gateway device or the mobile device.

13. The method of claim 11, further comprising receiving information indicative of a status of the cockroach monitor using the mobile device, the information including the detected presence of one or more cockroaches in the monitoring chamber.

14. The method of claim 13, further comprising using the mobile device to analyze the information indicative of the status of the cockroach monitors to indicate a need for one or more actions including at least one of replacing the cockroach monitor or indicating a cockroach infestation.

15. The method of claim 10, wherein emitting the light comprises emitting the light from a light-emitting diode (LED), and receiving the light comprises receiving the light by a phototransistor.

16. The method of claim 10, wherein placing the circuit board adjacent the ceiling in the monitoring chamber comprising placing a flexible circuit board adjacent the ceiling in the monitoring chamber, the flexible circuit board including multiple light-emitting diodes (LEDs) as the light emitter and multiple phototransistors as the photoelectric transducer.

17. A pest control system, comprising:

a cockroach monitor including:

a housing forming a monitoring chamber having one or more openings to allow cockroaches to enter the monitoring chamber and a ceiling to face backs of the cockroaches entering the monitoring chamber;

a transparent board having a sticky surface, the board configured to be detachably attached to the ceiling to capture the cockroaches in the monitoring chamber by the backs of the cockroaches using the sticky surface; and a cockroach detector configured to detect a status of the board indicating one or more cockroaches trapped on the board when the board is attached to the ceiling, the cockroach detector including:

a light emitter configured to emit a light;

a photoelectric transducer configured to receive the light and to produce an electrical signal indicative of an intensity of the received light; and a detection circuit configured to detect the status of the board by analyzing the electrical signal to determine presence of obstruction on a path of the light between the light emitter and the photoelectric transducer.

18. The system of claim 17, wherein the light emitter comprises multiple light-emitting diodes (LEDs), and the photoelectric transducer comprises multiple phototransistors.

19. The system of claim 18, wherein the ceiling comprises an arched ceiling, and the board comprises an arched board having a shape configured to substantially match the shape of the arched ceiling.

20. The system of claim 17, wherein the cockroach monitor comprises a circuit board placed between the ceiling and the board, the circuit board including:

the light emitter positioned and oriented to emit the light toward a surface on which the cockroach monitor is placed; and the photoelectric transducer positioned and oriented to receive the light reflected from the surface on which the cockroach monitor is placed.

21. The system of claim 20, wherein the circuit board comprises a flexible circuit board configured to be shaped to substantially matching a shape of the ceiling when being positioned between the ceiling and the board.

22. The system of claim 17, wherein the cockroach monitor comprises a first circuit board placed at one end of the monitoring chamber and a second circuit board placed at an opposite end of the monitoring chamber, the first circuit board including the light emitter positioned and oriented to emit the light toward the second circuit board, the second circuit board including the photoelectric transducer positioned and oriented to receive directly the light emitted from the light emitter.

* * * * *